(12) United States Patent
Beyhaghi et al.

(10) Patent No.: US 11,841,088 B2
(45) Date of Patent: Dec. 12, 2023

(54) SYSTEM AND METHOD FOR LEAKAGE MITIGATION

(71) Applicant: Rheem Manufacturing Company, Atlanta, GA (US)

(72) Inventors: Saman Beyhaghi, Montgomery, AL (US); Atilhan Manay, Roswell, GA (US); Christopher Freeman, Roswell, GA (US); Chirag Gurukiran, Edison, NJ (US); Jesse T. Goodwin, Knoxville, TN (US); Sarah H. Lincoln, Atlanta, GA (US); William G. Plummer, Norwich (GB)

(73) Assignee: Rheem Manufacturing Company, Atlanta, GA (US)

( * ) Notice: Subject to any disclaimer, the term of this patent is extended or adjusted under 35 U.S.C. 154(b) by 174 days.

(21) Appl. No.: 17/171,343

(22) Filed: Feb. 9, 2021

(65) Prior Publication Data

US 2022/0252173 A1 Aug. 11, 2022

(51) Int. Cl.
*F16K 17/36* (2006.01)
*F16K 17/32* (2006.01)
(Continued)

(52) U.S. Cl.
CPC .............. *F16K 17/36* (2013.01); *F16K 17/32* (2013.01); *E03B 7/071* (2013.01); *F16K 17/363* (2013.01); *F24H 9/136* (2022.01); *F24H 9/2007* (2013.01)

(58) Field of Classification Search
CPC .......... E03B 7/071; F16K 17/32; F16K 17/36; F16K 17/363; F24H 9/136; F24H 9/2007; Y02A 20/15

(Continued)

(56) References Cited

U.S. PATENT DOCUMENTS 3,069,671 A 12/1959 Taylor
3,920,031 A * 11/1975 Maxfield ............... F24H 9/2007
251/74

(Continued)

FOREIGN PATENT DOCUMENTS

RU        88779 U1   11/2009
WO   2013099946 A1    7/2013

OTHER PUBLICATIONS

International Search Report and Written Opinion issued in international application No. PCT/US2022/015022, dated May 12, 2022, 7 pp.

*Primary Examiner* — Steven B McAllister
*Assistant Examiner* — Benjamin W Johnson
(74) *Attorney, Agent, or Firm* — Eversheds Sutherland (US) LLP

(57) ABSTRACT

A leakage mitigation system to trigger a preventive action against detected leakage from a liquid enclosure, includes a leakage detection device disposed along base of the liquid enclosure. The system includes an absorbent that actuates the leakage detection device from a first state to a second state based on a volume of liquid leaked from the liquid enclosure. The device includes a valve coupled to an inlet pipe of the liquid enclosure and configured to allow flow of liquid through the inlet pipe in an open condition thereof and restrict flow of liquid through the inlet pipe in a closed condition thereof. The system further includes a shut-off actuator coupled to the valve and configured to actuate the valve from the open condition to the closed condition in response to the device being actuated from the first state to the second state.

19 Claims, 8 Drawing Sheets

(51) Int. Cl.
    *E03B 7/07*         (2006.01)
    *F24H 9/20*        (2022.01)
    *F24H 9/13*        (2022.01)

(58) Field of Classification Search
    USPC ........................................................ 122/14.3
    See application file for complete search history.

(56) References Cited

U.S. PATENT DOCUMENTS

| | | | | |
|---|---|---|---|---|
| 4,305,420 | A * | 12/1981 | Nussdorf | D06F 39/081 |
| | | | | 307/118 |
| 5,029,605 | A | 7/1991 | Dowling et al. | |
| 5,079,853 | A * | 1/1992 | Kurokawa | B29C 37/0092 |
| | | | | 34/95 |
| 7,424,896 | B1 * | 9/2008 | Martin | F16K 31/001 |
| | | | | 122/504 |
| 8,061,380 | B1 * | 11/2011 | Martin | F16K 17/40 |
| | | | | 122/504 |
| 8,443,823 | B1 * | 5/2013 | Prager | F16K 17/40 |
| | | | | 251/303 |
| 2015/0005734 | A1 | 1/2015 | Inoue et al. | |
| 2019/0145662 | A1 * | 5/2019 | Gardner | F24H 9/2007 |
| | | | | 122/507 |

\* cited by examiner

SYSTEM AND METHOD FOR LEAKAGE MITIGATION

TECHNICAL FIELD

The present disclosure relates, in general, to detecting leakage of liquid from a container and, more specifically relates, to a leakage mitigation system to mitigate leakage of water from a water heater.

BACKGROUND

Liquid containers, such as water heaters, may be subjected to deterioration over a period of time. Such deterioration may compromise stability of the water heater and may cause water stored in a storage tank of the water heater to leak. For example, the water may leak from the storage tank and eventually pool at a base of the water heater. When left undetected and unattended, such water leaks may result in damage to furniture, electrical equipment, and the water heater itself, which may result in costly repairs. Further, the water leak could create hazardous working environment for individuals in the vicinity of such leaks. Therefore, it is desirable to detect the presence of such leaks and trigger preventive action to either shut down or isolate a source of water from the leaks to prevent the damage.

Known solutions to detect the leak, and prevent further damage, require supply of electric power and electrical control mechanisms with an electrical actuation and detection system. For example, existing solutions rely on sensors for leak detection and electric power for transmitting signals to a control board and then to an electrically operated shut-off valve coupled to the source of water. Such solutions are expensive and cumbersome to implement with all appliances.

SUMMARY

According to one aspect of the present disclosure, a leakage mitigation system is provided. The leakage mitigation system includes a leakage detection device disposed proximate a base of a liquid enclosure. The leakage detection device includes an absorbent configured to actuate the leakage detection device from a first state to a second state based on a volume of liquid leaked from the liquid enclosure. In an embodiment, the absorbent is a Super Absorbent Polymer (SAP) selected from a list comprising sodium polyacrylate and Potassium Polyacrylate. The leakage detection device further includes a housing having an open end and a piston movably received within the housing. The piston defines a hollow chamber configured to house the absorbent therein, such that an expansion of the absorbent causes travel of the piston to actuate the liquid detection device from the first state to the second state. The leakage detection device further includes a lid attached to the open end of the housing and configured to allow flow of leaked liquid to the absorbent. In an embodiment, the lid is detachably coupled to the open end of the housing using a snap fit. Further, the lid defines one or more openings covered with mesh configured to allow flow of the leaked water therethrough.

The leakage mitigation system further includes a valve coupled to an inlet pipe of the liquid enclosure. The valve is configured to allow flow of liquid through the inlet pipe in an open condition thereof and restrict flow of liquid through the inlet pipe in a closed condition thereof. The leakage mitigation system further includes a shut-off actuator mechanically coupled to the valve and configured to actuate the valve from the open condition to the closed condition in response to the leakage detection device being actuated from the first state to the second state. The leakage mitigation system further includes a cable extending between the leakage detection device and the shut-off actuator, the cable configured to actuate the shut-off actuator based on a volume of liquid absorbed by the absorbent. In an embodiment, the piston includes an arm extending along a central longitudinal axis thereof and passing through an aperture defined in the lid and mechanically coupled with the cable.

In an embodiment, the shut-off actuator includes a platform coupled to a stem of the valve, and an actuator plate disposed on the platform and configured to rigidly and rotatably engage with the stem of the valve. The shut-off actuator further includes a pawl having a first end pivotally coupled to the platform, a second end mechanically attached to the cable, and a tooth located between the first end and the second end thereof. In an embodiment, the actuator plate includes an extended portion configured to slidably engage with the tooth of the pawl. With such an arrangement, the tooth is configured to retain the actuator plate in a stationary condition corresponding to the open condition of the valve.

In an embodiment, based on the volume of liquid absorbed by the absorbent, the cable is configured to apply a pull-force at the second end of the pawl causing the pawl to move about the first end thereof. The movement of the pawl allows the tooth to disengage from the actuator plate, allows the actuator plate to rotate, and allows actuation of the valve from the open condition to the closed condition.

The shut-off actuator further includes a stem extension having a first end and a second end distal to the first end. The first end of the stem extension is detachably attached to the stem of the valve, where the first end of the stem extension is configured to rigidly engage with the stem of the valve via the actuator plate. Further, a biasing member of the shut-off actuator is disposed around the stem extension and is configured to exert a biasing force on the actuator plate in the stationary condition corresponding to the open condition of the valve. In an embodiment, under an influence of the biasing force, the stem extension is configured to rotate along with the actuator plate upon disengagement of the tooth of the pawl and the actuator plate. In an embodiment, the platform includes one or more stoppers configured to restrict rotational movement of the actuator plate. The shut-off actuator further includes a handle coupled to the second end of the stem extension. The handle is configured to reset the valve to the open condition.

According to another aspect of the present disclosure, a method for mitigating leakage in a liquid enclosure is provided. The method includes allowing a volume of liquid leaked from a liquid enclosure to enter a leakage detection device disposed proximate a base of the liquid enclosure. The method further includes allowing an absorbent of the leakage detection device to absorb at least a portion of the volume of liquid and cause actuation of the leakage detection device from a first state to a second state. The method further includes mechanically actuating a shut-off actuator, coupled to a valve disposed in an inlet pipe of the liquid enclosure, to actuate the valve from an open condition to a closed condition in response to the leakage detection device being actuated from the first state to the second state. The valve is configured to allow flow of liquid through the inlet pipe in the open condition and restrict flow of liquid through the inlet pipe in the closed condition.

In an embodiment, the method further includes applying a pull-force on the shut-off actuator through the cable upon actuation of the leakage detection device from the first state to the second state, and actuating the valve from the open condition to the closed condition based on the pull-force applied on the shut-off actuator.

According to yet another aspect of the present disclosure, a water heater includes a tank, an inlet pipe configured to allow ingress of water into the tank, a jacket disposed around the tank, and a channel disposed in an annular space between the tank and the jacket. The channel is disposed proximate a base of the water heater and configured to collect water leaked from the tank. The water heater further includes a leakage mitigation system configured to shut off flow of water to the tank based on a volume of water leaked from the tank.

In an embodiment, the leakage mitigation system includes a leakage detection device disposed along the channel and configured to receive the water leaked from the tank. The leakage detection device includes an absorbent configured to actuate the leakage detection device from a first state to a second state based on a volume of water absorbed by the absorbent. In an embodiment, the leakage detection device includes a housing having an open end, a piston movably received within the housing and defining a hollow chamber configured to house the absorbent therein, and a lid attached to the open end of the housing and configured to allow flow of water to the absorbent. Expansion of the absorbent causes travel of the piston to actuate the leakage detection device from the first state to the second state.

The leakage mitigation system further includes a valve coupled to the inlet pipe of the water heater. The valve is configured to allow flow of water through the inlet pipe in an open condition thereof, and to restrict flow of water through the inlet pipe in a closed condition thereof. The leakage mitigation system further includes a shut-off actuator mechanically coupled to the valve. The shut-off actuator is configured to actuate the valve from the open condition to the closed condition in response to the leakage detection device being actuated from the first state to the second state. The leakage mitigation system further includes a cable extending between the leakage detection device and the shut off actuator. The cable is routed between the tank and the jacket and is configured to actuate the shut off actuator based on the volume of water absorbed by the absorbent.

In an embodiment, the shut-off actuator includes a platform coupled to a stem of the valve, and an actuator plate disposed on the platform and configured to rigidly and rotatably engage with the stem of the valve. The shut-off actuator further includes a biasing member disposed on the platform and configured to exert a biasing force on the actuator plate in a stationary condition corresponding to the open condition of the valve. The shut-off actuator also includes a pawl having a first end pivotally coupled to the platform, a second end mechanically attached to the cable, and a tooth located between the first end and the second end thereof. The tooth is configured to retain the actuator plate in a stationary condition corresponding to the open condition of the valve. In an embodiment, based on the volume of liquid absorbed by the absorbent, the cable is configured to apply a pull-force at the second end of the pawl causing the pawl to move about the first end thereof. The movement of the pawl allows the tooth to disengage from the actuator plate, allows the actuator plate to rotate, and allows actuation of the valve from the open condition to the closed condition.

In an embodiment, the water heater further includes an opening defined in the jacket proximate the base of the water heater to allow access to the leakage detection device from outside, and a door coupled to the jacket to close the opening.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1A:
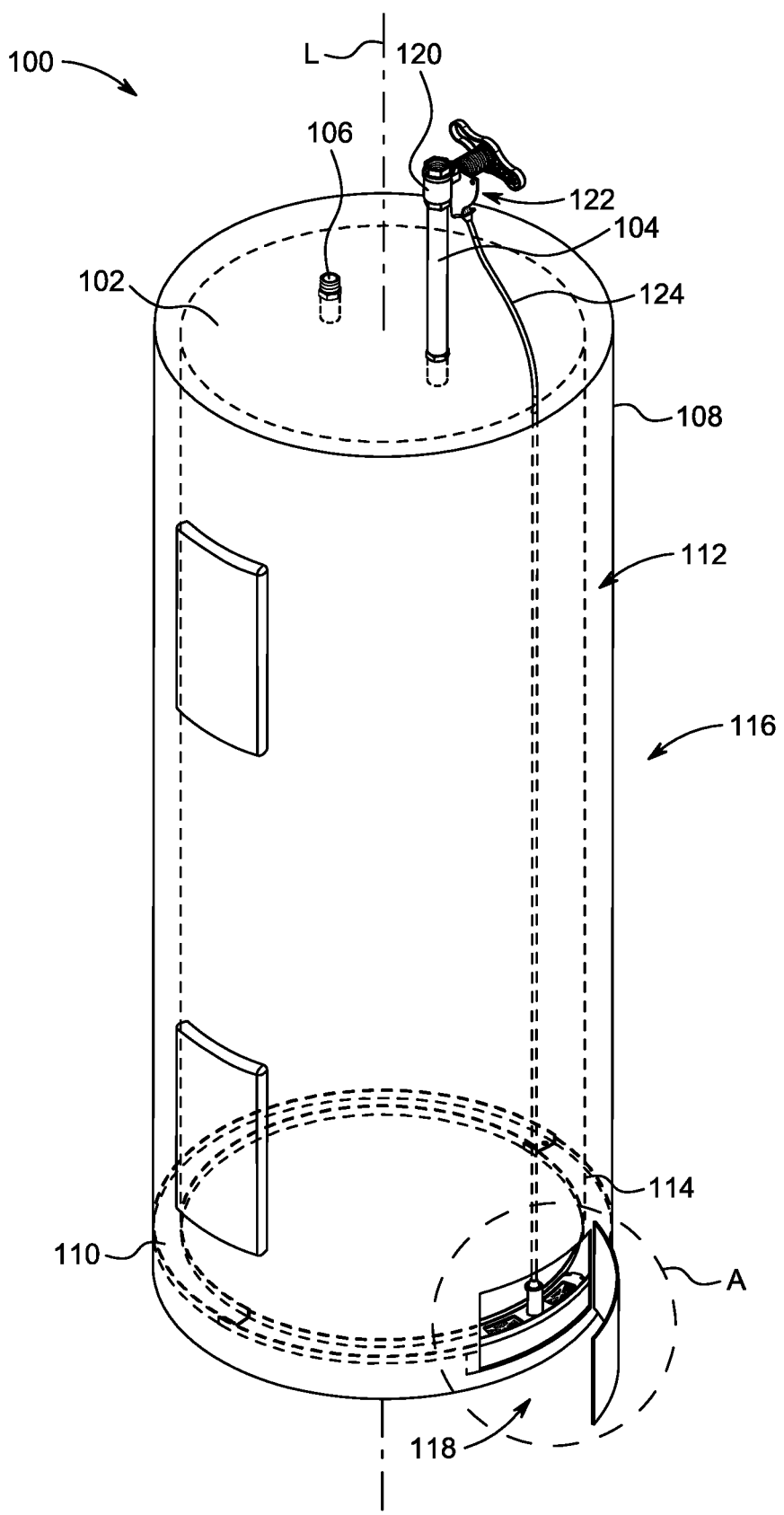
FIG. 1A is a perspective view of a water heater implementing a leakage mitigation system, according to an embodiment of the present disclosure.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Aspects of the present disclosure are directed to a leakage mitigation system which uses an absorbent, such as a super absorbent polymer (SAP), to trigger a preventive action when leakage of water from an appliance, such as a water heater, is detected. According to the aspects of the present disclosure, the leakage mitigation system includes mechanical components, thereby providing low-cost solutions to mitigate water leakage.

Referring to FIG. 1, a perspective view of a water heater 100 is illustrated. According to an aspect of the present disclosure, the water heater 100 may be embodied as a gas water heater or an electric water heater. The water heater 100 includes a tank 102 having a longitudinal axis an inlet pipe 104 configured to allow ingress of water into the tank 102, and an outlet fitting 106 configured to extract heated water from the tank 102, and a jacket 108 to conceal the tank 102. In the present disclosure, the "tank 102" is alternatively referred to as "liquid enclosure". In an embodiment, the inlet pipe 104 may be implemented as a dip tube. The water heater 100 further includes a channel 110 disposed in an annular space 112 formed between the tank 102 and the jacket 108, and proximate a base 114 of the tank 102. The channel 110 is embodied as a tray configured to collect water leaked from the tank 102.

In an embodiment, the water heater 100 further includes a leakage mitigation system 116 configured to shut off the supply of water to the tank 102 as preventive action based on a volume of water leaked from the tank 102. The leakage mitigation system 116 includes a leakage detection device 118 disposed along the channel 110 and configured to receive the water leaked from the tank 102. The leakage mitigation system 116 further includes a valve 120 coupled to the inlet pipe 104 and configured to allow flow of water through the inlet pipe 104 in an open condition thereof, and to restrict flow of water through the inlet pipe 104 in a closed condition thereof. In one embodiment, the valve 120 may be implemented as a spring-loaded ball valve. In another embodiment, the valve 120 may be implemented as one of a gate valve, a globe valve, a butterfly valve, or a check valve. For the purpose of actuating the valve 120, the leakage mitigation system 116 further includes a shut-off actuator 122 mechanically coupled to the valve 120. The shut-off actuator 122 is configured to actuate the valve 120 from the open condition to the closed condition. Further, a cable 124 of the leakage mitigation system 116 extends between the leakage detection device 118 and the shut-off actuator 122. In an embodiment, the cable 124 may be embodied as a Bowden cable, which is known to include a hollow outer cable sheath housing an inner flexible cable that is used to transmit mechanical force. In cases where water heaters include inlet pipe(s) located at the bottom thereof or anywhere on the tank 102, the length of the cable 124 extending between corresponding leakage detection device and shut-off actuator may be reduced.

Figure 1B:
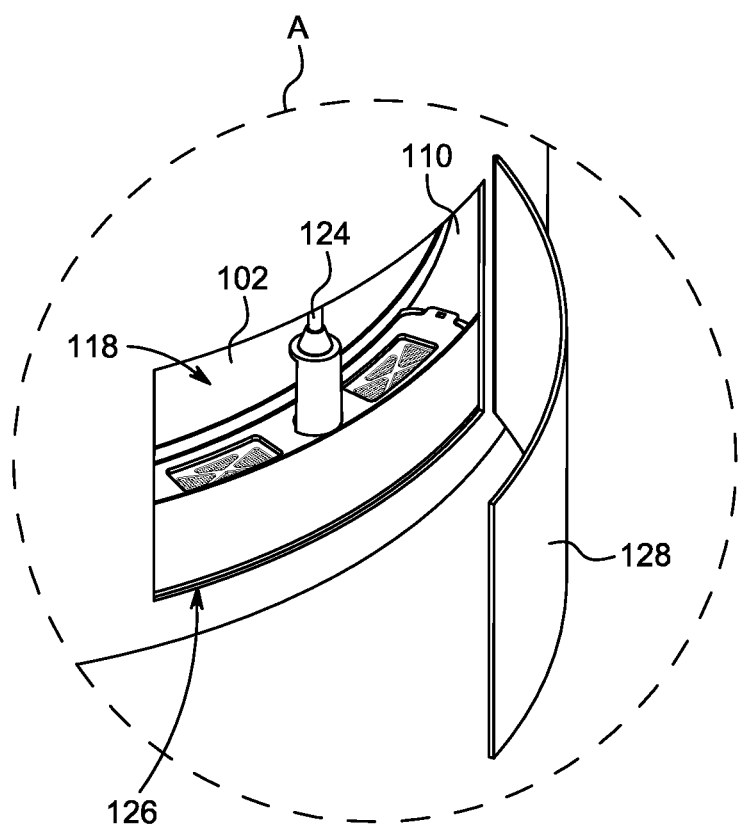
FIG. 1B is an enlarged view of a portion A in FIG. 1A showing a leakage detection device, according to an embodiment of the present disclosure.

FIG. 1B is an enlarged view of a portion 'A' in FIG. 1A showing the leakage detection device 118. In an embodiment, the leakage detection device 118 includes an arcuate structure that conforms with a surface of the tank 102. Further, the channel 110 may be disposed slightly inclined towards the leakage detection device 118, such that the water leaked and collected in the channel 110 is allowed to flow towards the leakage detection device 118. As illustrated in FIG. 1A and FIG. 1B, the leakage detection device 118 is disposed in the annular space 112 and remains concealed by the jacket 108. Additionally, since a portion of the cable 124 is routed along the annular space 112, the cable 124 also remains concealed by the jacket 108. Thus, the jacket 108 may enhance the aesthetics of the water heater 100. In an embodiment, the water heater 100 defines an opening 126 proximate the base 114 to allow access to the leakage detection device 118 from outside. A door 128 is coupled to the jacket 108, specifically to a periphery of the opening 126, to close the opening 126. The door 128 may be selectively accessed by a user to perform maintenance activity on the leakage detection device 118. In another embodiment, the leakage detection device 118 may be located outside the jacket 108.

Figure 2:
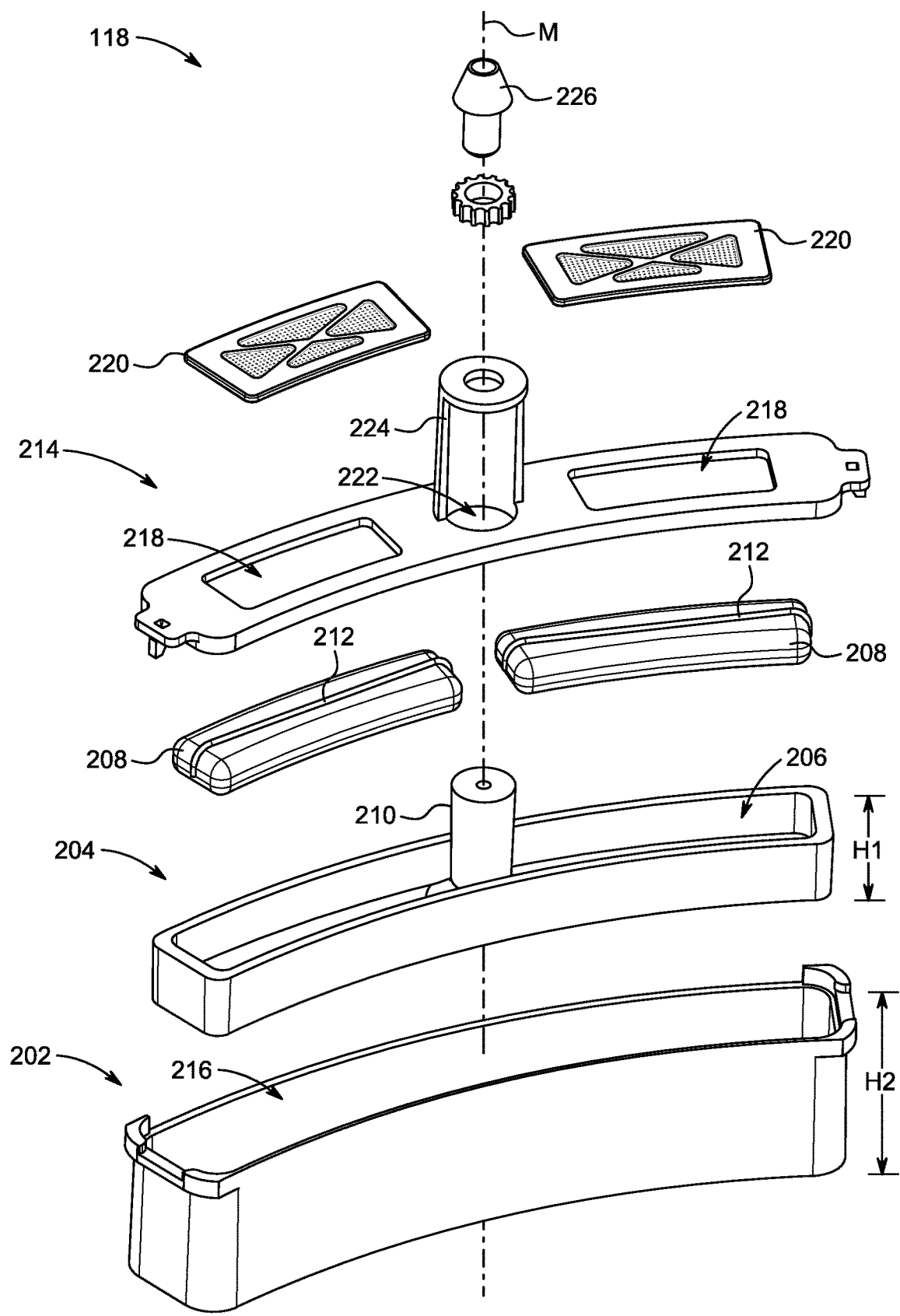
FIG. 2 is an exploded view of the leakage detection device, according to an embodiment of the present disclosure.

FIG. 2 illustrates an exploded view of the leakage detection device 118. In an embodiment, components of the leakage detection device 118 may be injection molded using polyoxymethylene (POM). In some examples, the components may be made from acrylonitrile butadiene styrene (ABS), polybutylene terephthalate (PBT), polycarbonate (PC), polypropylene (PP), or polystyrene (PS). However, other materials known to a person skilled in the art may be used to manufacture the components of the leakage detection device 118.

In an embodiment, the leakage detection device 118 includes a housing 202 having an open end 216, and a piston 204 movably received within the housing 202. The housing 202 may be embodied as a trough extending along a longitudinal axis 'M' of the leakage detection device 118. In an embodiment, a height 'H1' of the piston 204 may be half the height 'H2' of the housing 202. Such configuration allows space for the piston 204 to slide within the housing 202. Further, the piston 204 defines a hollow chamber 206 configured to house absorbent 208 therein. In an embodiment, the absorbent 208 may be a super absorbent polymer (SAP) implemented as one of sodium polyacrylate or potassium polyacrylate. These SAPs are super-hydrophilic polymers which expand more than 200 times upon absorption of water. Particularly, sodium polyacrylate exhibits an expansion factor of approximately 1000 times an original volume. Additionally, the SAPs are known as non-toxic and chemically inert materials which can be obtained at low cost, thereby rendering the leakage detection device 118 safe and cost-effective. In some embodiments, compressed and dried cellulose sponge, either as a block or in shredded form, may be used as the absorbent 208. In addition, such sponge may include fine grains of SAP interspersed therein and may be covered by a water dissolving skin to protect the sponge from humidity. However, other substances which exhibit similar expansion properties, known to the person skilled in the art, may be implemented.

Furthermore, the piston 204 includes an arm 210 extending along a longitudinal axis thereof. For the sake of brevity, the longitudinal axis of the piston 204 is considered as the longitudinal axis 'M' of the leakage detection device 118. The arm 210 is configured to mechanically couple with the cable 124. In cases where the cable 124 is implemented as the Bowden cable, the inner flexible cable may be mechanically coupled to the arm 210. In an embodiment, the mechanical coupling between the inner flexible cable and the arm 210 may be achieved with the aid of a split washer which may retain the hollow outer cable sheath thereby allowing movement of the inner flexible cable therewithin. In the illustrated embodiment, the arm 210 extends from a bottom surface of the piston 204, thereby dividing the hollow chamber into two portions. Accordingly, the absorbent 208 may be provided in two packets or cartridges, where each packet of the absorbent 208 is disposed in one portion of the hollow chamber 206. Each portion of the hollow chamber 206 may include sufficient space to allow expansion of the absorbent 208 upon absorption of water. A remainder of the sufficient space in the piston 204 may define a temporary reservoir for the water received into the piston 204. In an embodiment, each packet of the absorbent 208 may be embodied as permeable and non-degradable woven nylon sack and beads of the absorbent 208 may be disposed therein. Additionally, cords 212 are provided on each pack to allow the user to easily pull out the packs from the piston 204. In an example, the cords 212 may be made of nylon. The two packs of absorbent 208 are collectively referred to as "the absorbent 208" in the present disclosure. In another embodiment, the piston 204 may be embodied as a plate-like structure and the packets of absorbent 208 may be attached to a bottom surface of the plate-like structure. In such an arrangement, the plate-like structure may define one or more holes to allow flow of water to the packets of absorbent 208.

The leakage detection device 118 further includes a lid 214 configured to attach to the open end 216 of the housing 202 and configured to allow flow of leaked liquid, such as water, to the absorbent 208. In one embodiment, the lid 214 may be detachably coupled to the open end 216 of the housing 202 using, but not limited to, a snap fit. From the illustrated embodiment, other means for coupling the lid 214 to the housing 202 and allowing easy detachment thereof may be apparent to the person skilled in the art. The lid 214 defines one or more openings 218 covered with mesh configured to allow flow of the leaked water therethrough. In an embodiment, mesh plates 220 may be configured to cover the openings 218 in the lid 214 and allow flow of the leaked water therethrough. The mesh plates 220 may prevent any large foreign particles from entering the leakage detection device 118. In another embodiment, the mesh plates 220 may be integral to the lid 214. In yet another embodiment, the lid 214 may be manufactured from a rigid mesh material configured to allow flow of water therethrough.

Further, the lid 214 defines an aperture 222 configured to receive the arm 210 of the piston 204 therethrough. A cable attachment member 224 extends from the lid 214 along the longitudinal axis 'M' and is configured to receive a cable guide 226. The cable 124 is guided through the cable guide 226 and is mechanically coupled (see FIG. 3A and FIG. 3B) to the arm 210 of the piston 204 received into the cable attachment member 226 via the aperture 222.

Figure 3A:
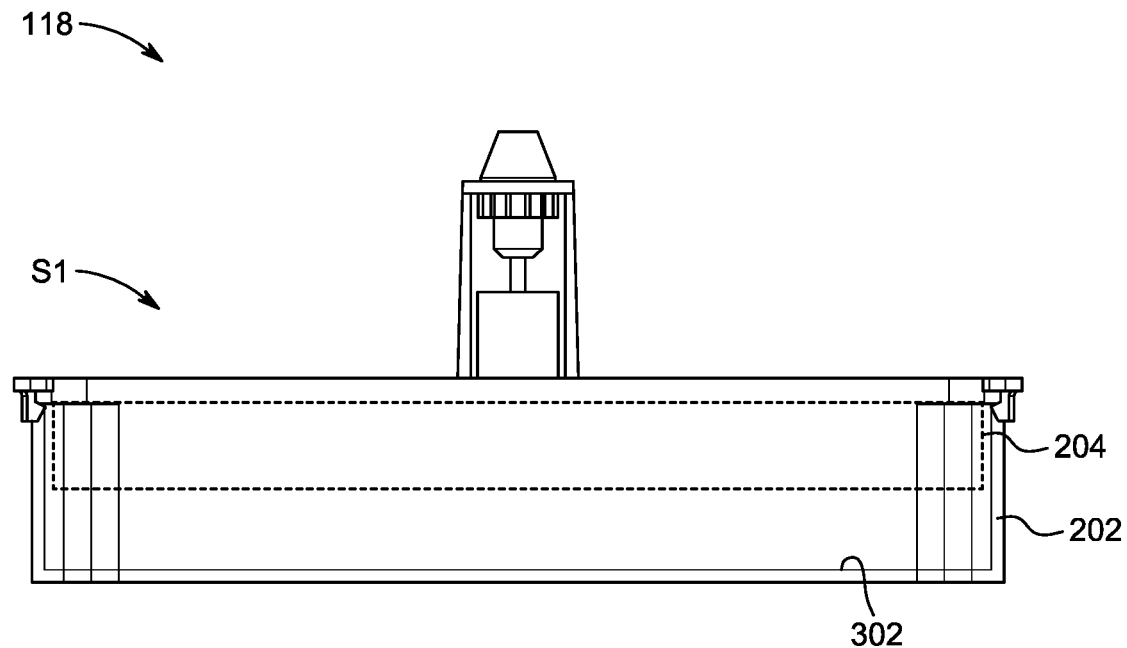
FIG. 3A is a front view of the leakage detection device in a first state, according to an embodiment of the present disclosure.
Figure 3B:
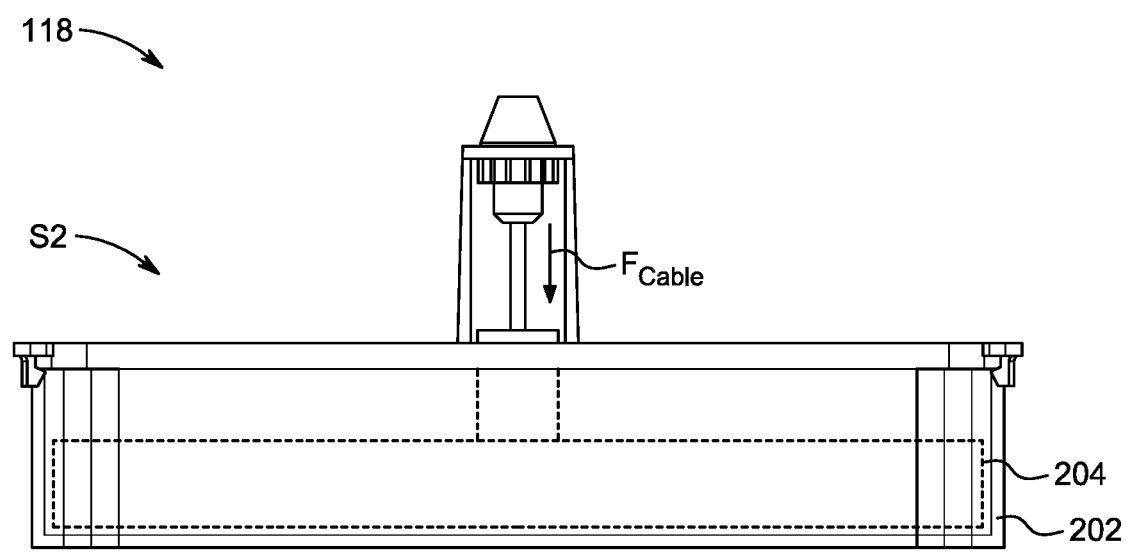
FIG. 3B is the front view of the leakage detection device in a second state, according to an embodiment of the present disclosure.

FIG. 3A illustrates a front view of the leakage detection device 118 in a first state 'S1' and FIG. 3B illustrates the front view of the leakage detection device 118 in a second state 'S2'. FIG. 3A and FIG. 3B are described in conjunction with FIG. 1A to FIG. 2. As used herein, the term 'first state' refers to a condition when no water has flown into the leakage detection device 118, and the term 'second state' refers to a condition when the absorbent 208 absorbs the water flowing into the leakage detection device 118. When there is no leakage or until the leaked water has reached the absorbent 208, the leakage detection device 118 remains to be in the first state 'S1', where the piston 204 remains at a top of the housing 202 as shown in FIG. 3A. When the leaked water flows into the leakage detection device 118, the absorbent 208 absorbs the water and expands in volume within the hollow chamber 206 of the piston 204. Such expansion of the absorbent 208 increases the force exerted on the piston 204 and causes travel of the piston 204 towards a bottom surface 302 of the housing 202, thereby actuating the liquid detection device 118 from the first state 'S1' to the second state 'S2' based on a volume of water leaked from the tank 102. The travel of the piston 204 develops a pull-force ($F_{Cable}$) in the cable 124. In some embodiments, amount of the absorbent 208 provided in each packet or cartridge may be predetermined based on the volume of the tank 102 to produce sufficient pull-force ($F_{Cable}$) in the cable 124.

In another embodiment, the first state 'S1' and the second state 'S2' may be swapped. For example, the absorbent 208 may be disposed along the bottom surface 302 of the housing 202 and a piston plate (not shown) may be disposed on the absorbent 208. The piston plate may define one or more openings to allow flow of leaked water toward the absorbent 208. In such an arrangement, upon absorption of the water, the absorbent 208 expands and pushes the piston plate upwards, thereby causing upward travel of the piston plate along the longitudinal axis 'M'. Further, the cable 124 may be attached to the arm 210 of the piston plate through the cable attachment member 224 in a manner such that the upward travel of the piston plate develops the pull force ($F_{Cable}$) in the cable 124. For example, the cable 124 may be guided through a guide (not shown) attached to the lid 214, to allow a bend, for example about 180 degrees bend, in routing of the cable 124 towards the arm 210. In both these embodiments, the piston 204 or the piston plate may be allowed to move after the absorbent 208 reaches a predetermined size during expansion. This prevents any false actuation of the leakage detection device 118 from the first state 'S1' to the second state 'S2'. From the embodiments described herein, other arrangements between the cable 124 and the piston 204 capable of producing the pull force ($F_{Cable}$) in the cable 124 may be apparent to the person skilled in the art.

Figure 4:
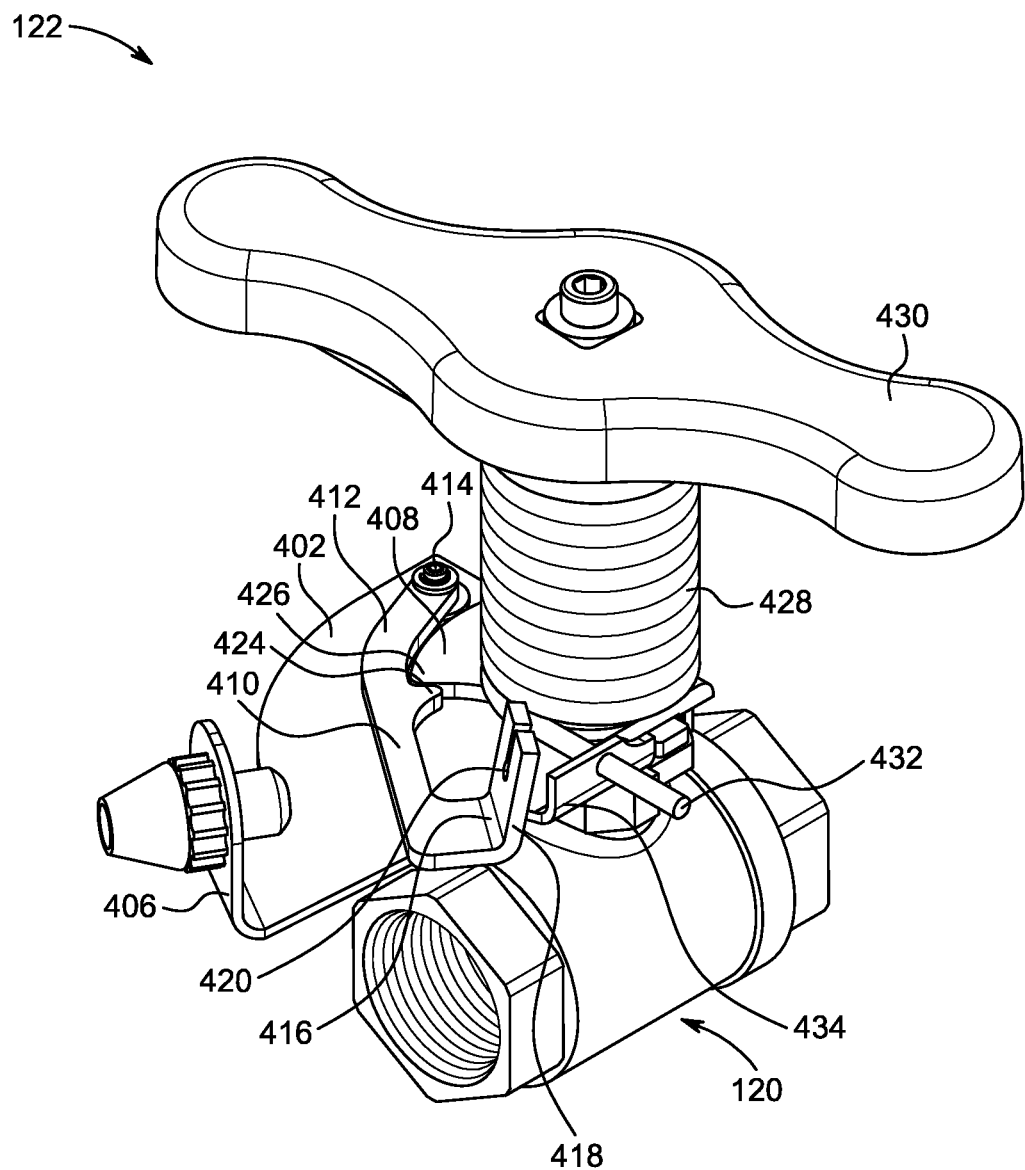
FIG. 4 is a perspective view of a shut-off actuator coupled to a valve of the water heater, according to an embodiment of the present disclosure.
Figure 5:
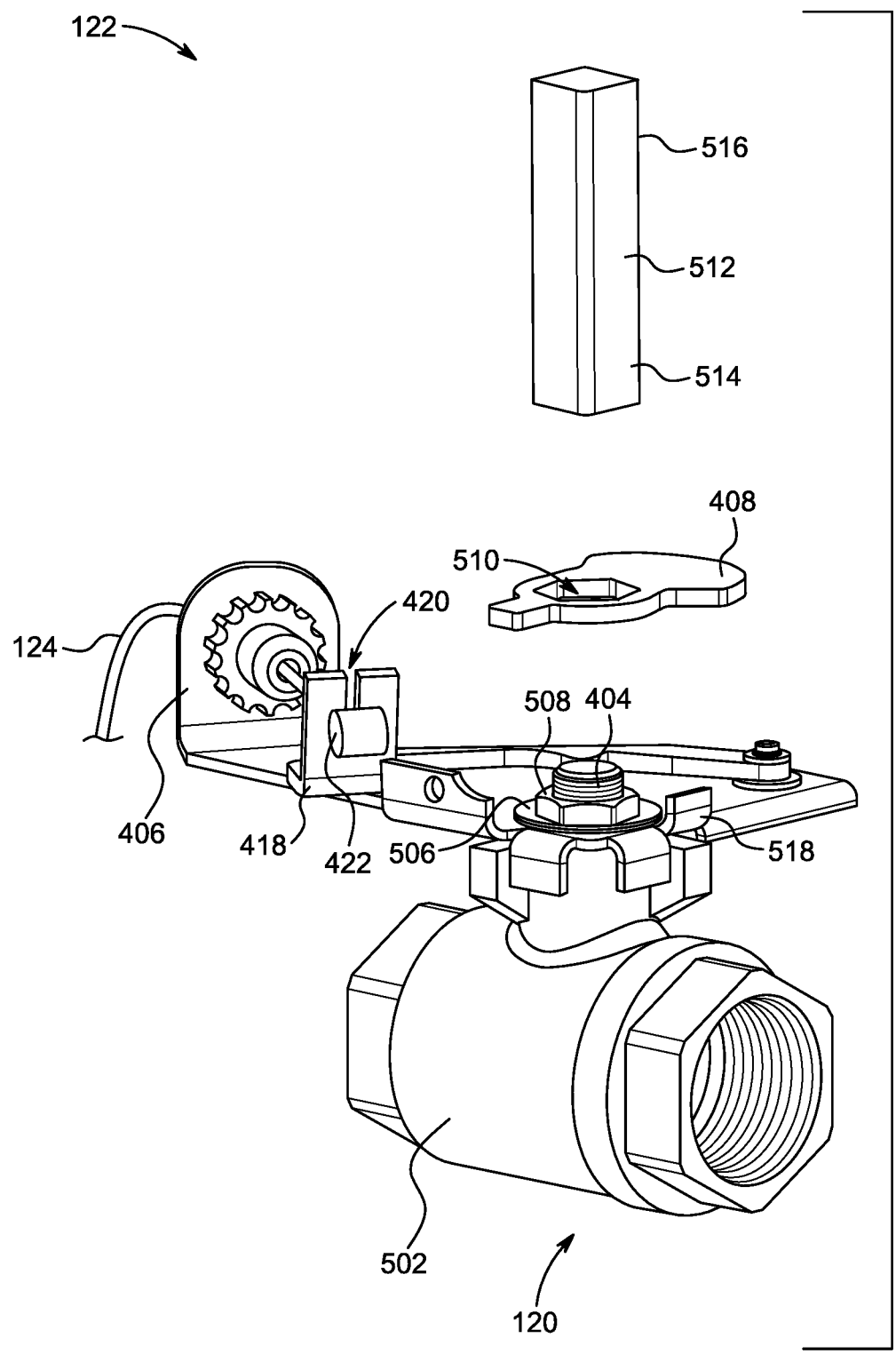
FIG. 5 shows a partially exploded view of the shut-off actuator, according to an embodiment of the present disclosure.

FIG. 4 illustrates a perspective view of the shut-off actuator 122 coupled to the valve 120 and FIG. 5 illustrates a partially exploded view of the shut-off actuator 122. Components and operation of the shut-off actuator 122 are described together with FIG. 4 and FIG. 5. In an embodiment, the shut-off actuator 122 includes a platform 402 coupled to a stem 404 (shown in FIG. 5) of the valve 120. In an example, the platform 402 may be made of stainless steel or aluminum and may be manufactured from metal stamping and metal bending process. In other example, the platform 402 may be made of reinforced plastic or thermoplastic and may be manufactured using injection molding or 3D printing process. The platform 402 includes a first bend portion 406 configured to couple with the cable 124. The shut-off actuator 122 further includes an actuator plate 408 disposed on the platform 402 and a pawl 410 having a first end 412 pivotally coupled to the platform 402 via a fastener 414. A second end 416 of the pawl 410 is configured to mechanically attach to the cable 124. In an embodiment, the second end 416 of the pawl 410 includes a second bend portion 418 defining a slit 420 (also show in FIG. 5) to retain the cable 124 with the aid of a retainer 422 (shown in FIG. 5). In an example, the pawl 410 may be manufactured from stamping and bending process. The pawl 410 further includes a tooth 424 located between the first end 412 and the second end 416 thereof, where the tooth 424 is configured to retain the actuator plate 408 in a stationary condition corresponding to the open condition of the valve 120. In an embodiment, the actuator plate 408 includes an extended portion 426 configured to slidably engage with the tooth 424 of the pawl 410.

Referring to FIG. 5, the stem 404 of the valve 120 is embodied as an actuating member that is coupled to a valve element (not shown), such as the ball element of the ball valve, which when actuated causes the valve element to rotate and in turn actuate the valve 120 between the open condition and the close condition. In the illustrated embodiment, the stem 404 extends from a body 502 of the valve 120 and includes threads 504. Further, the platform 402 may define a hole (not shown) configured to engage with the stem 404 of the valve 120. For example, the hole of the platform 402 may be aligned with the stem 404 and the platform 402 may be moved towards the body 502 of the valve 120 until the stem 404 is received within the hole and the platform 402 is mounted on the body 502 of the valve 120. With help of a washer 506 and a nut 508, the platform 402 may be secured to the valve 120.

Further, the actuator plate 408 defines a hole 510 to engage with the stem 404. In an embodiment, the shut-off actuator 122 further includes a stem extension 512 having a first end 514 and a second end 516 distal to the first end 514. The first end 514 is configured to detachably attach to the stem 404 via the actuator plate 408. For example, the first end 514 of the stem extension 512 may be threadably engaged with the stem 404. Additionally, the first end 514 is rigidly engaged with the stem 404 via the hole 510 of the actuator plate 408, such that rotation of the stem extension 512 about the stem 404 causes rotation of the actuator plate 408. The shut-off actuator 122 further includes a biasing member 428 (see FIG. 4), for example a spring, disposed around the stem extension 512 and configured to exert a biasing force on the actuator plate 408 in the stationary condition corresponding to the open condition of the valve 120. In an embodiment, a handle 430 is coupled to the second end 516 of the stem extension 512. In such an arrangement, a first end 432 of the biasing member 428 is attached to a third bend portion 434 and a second end (not shown) of the biasing member 428 is attached to the handle 430. As such, rotation of the handle 430 develops the biasing force in the biasing member 428.

Setting the Shut-Off Actuator and Leakage Detection Device

The handle 430 may be rotated until the biasing member 428 is sufficiently biased, the actuator plate 408 is positioned radially away (as shown in FIG. 4) from the third bend portion 434 of the platform 402, and the valve 120 is actuated to the open condition where the valve allows flow of water through the inlet pipe 104. For example, an indicator may be provided on the body 502 of the valve 120 to indicate position of the valve member within the valve 120. The pawl 410 may then be engaged with the actuator plate 408 such that the tooth 424 abuts the extended portion 426 of the actuator plate 408 to retain the actuator plate 408 in the stationary condition.

Subsequently, one end of the cable 124 may be inserted through the slit 420 defined in the second bend portion 418 of the pawl 410 and may be secured in position with the help of the retainer 422, as shown in FIG. 5. Another end of the cable 124 may be mechanically coupled (see FIG. 3A and FIG. 3B) to the arm 210 of the piston 204 received into the cable attachment member 226. In an implementation, a cable adjustment barrel (not shown) may be used to allow adjustment of tension in the cable 124 extending between the shut-off actuator 122 and the leakage detection device 118. Such adjustment of the tension in the cable 124 may allow positioning of the piston 204 at the top of the housing 202, thereby configuring the leakage detection device 118 to the first state 'S1'. To this end, the shut-off actuator 122 and the leakage detection device 118 may be set and implemented with the water heater 100.

Operation of the Leakage Mitigation System

As described earlier, in the event of leakage in the water heater 100, the water leaked from the tank 102 and collected in the channel 110 flows into the leakage detection device 118. Based on the volume of liquid absorbed by the absorbent 208, the cable 124 is configured to actuate the shut-off actuator 122. Based on the volume of water leaked from the tank 102 and the volume of water flowing into the leakage detection device 118, the absorbent 208 is configured to actuate the leakage detection device 118 from the first state 'S1' to the second state 'S2', to develop the pull-force ($F_{Cable}$) in the cable 124.

Figure 6:
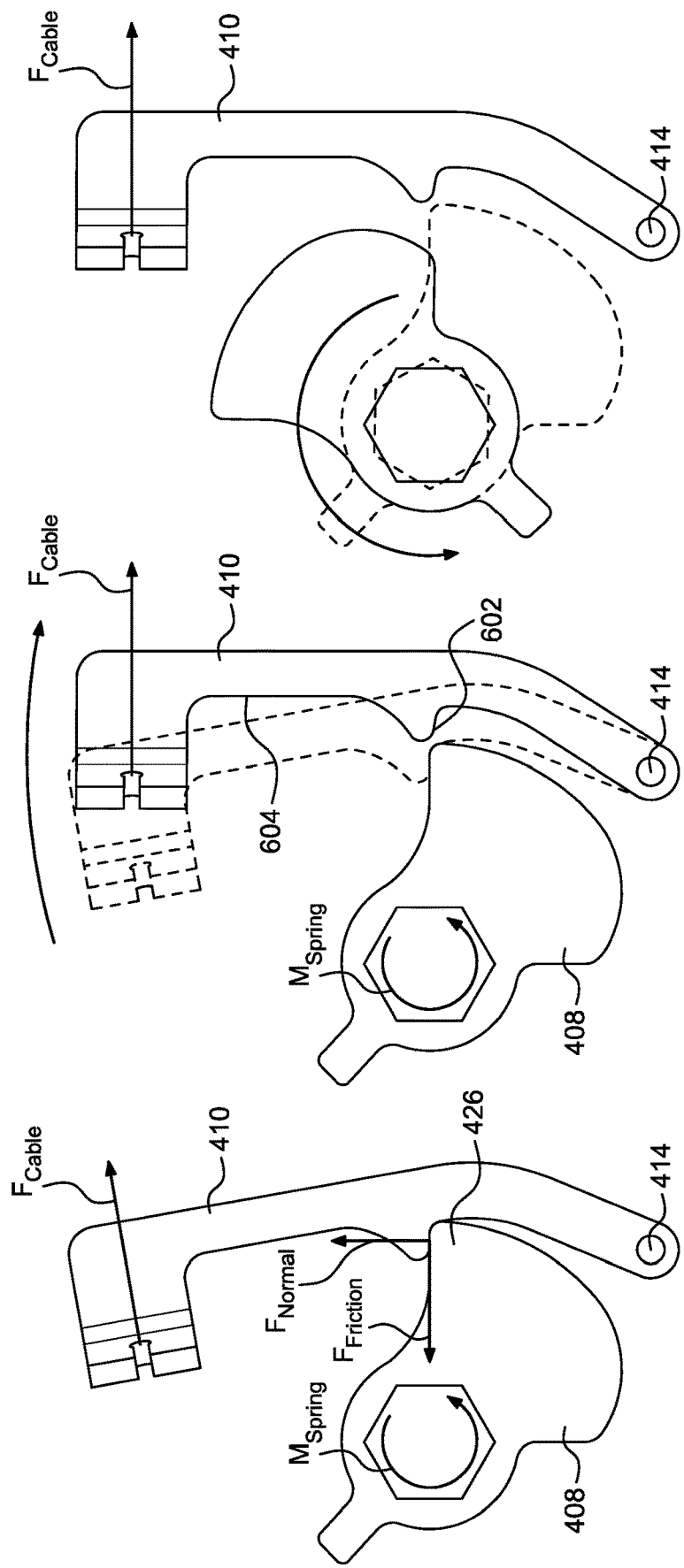
FIG. 6A shows an actuator plate of the shut-off actuator engaged with a pawl of the shut-off actuator, according to an embodiment of the present disclosure.
FIG. 6B shows the actuator plate being disengaged from the pawl, according to an embodiment of the present disclosure.
FIG. 6C shows the actuator plate disengaged from the pawl, according to an embodiment of the present disclosure.

FIG. 6A, FIG. 6B and FIG. 6C illustrates disengagement of the actuator plate 408 from the pawl 410, according to aspects of the present disclosure. Particularly, FIG. 6A illustrates the actuator plate 408 engaged with the pawl 410 corresponding to the first state 'S1' of the leakage detection device 118, where the extended portion 426 of the actuator plate 408 is retained by a friction force ($F_{Friction}$) present at the tooth 424 of the pawl 410 against a moment ($M_{Spring}$) of the biasing member 428. As a result of the moment ($M_{Spring}$) of the biasing member 428, a normal force ($F_{Normal}$) develops at the extended portion 426 of the actuator plate 408, in a direction perpendicular to the friction force ($F_{Friction}$), as shown in FIG. 6A. In an embodiment, a surface 602 of the tooth 424 may extend substantially perpendicular to a longitudinal surface 604 of the pawl 410, such that the surface 602 sustains the normal force ($F_{Normal}$) and retains the actuator plate 408 in the stationary condition.

Further, the pull-force ($F_{Cable}$) in the cable 124 causes the second end 416 of the pawl 410 to move in the direction of the pull-force ($F_{Cable}$) about the fastener 414, as shown in FIG. 6B, thereby disengaging the extended portion 426 of the actuator plate 408 from the surface 602 of the tooth 424. The normal force ($F_{Normal}$) allows the actuator plate 408 to rotate about the stem 404 of the valve 120. Under the influence of the biasing force, the stem 404, the stem extension 512, and the handle 430 is configured to rotate along with the actuator plate 408 upon movement of the pawl 410 and disengagement of the tooth 424 from the actuator plate 408. Therefore, the shut-off actuator 122 actuates the valve 120 from the open condition to the close condition in response to the leakage detection device 118 being actuated from the first state 'S1' to the second state 'S2'. As such, supply of water to the tank 102 may be ceased and leakage of water from the tank 102 may be stopped. In an embodiment, the platform 402 further includes a fourth bend portion 518, which, along with the third bend portion 434, function as stoppers, configured to restrict rotational movement of the actuator plate 408.

Resetting the Valve and the Leakage Detection Device

In order to reset the valve 120 to the open condition, the handle 430 may be rotated against the biasing force of the biasing member 428 until the valve member indicates the open condition and the actuator plate 408 is suitably positioned to engage with the pawl 410. It will be understood that a main source of water supply may be turned-off in order to reset the valve 120. Prior to resetting the valve 120, the leakage detection device 118 may be reset by accessing the door 128 in the jacket 108. The absorbent 208 may be removed by dismantling the leakage detection device 118. Either new packs of absorbents may be deployed in the piston 204 or the used absorbent 208 may be dried to remove water content and may be reused in the piston 204. Since the absorbent 208, such as the sodium polyacrylate, is non-toxic and chemically inert, special procedures for disposal of the absorbent 208 may not be required. Further, the super absorbent polymers are commercially available for low cost, which renders the replacement of the absorbent 208 in the leakage detection device 118 cost-effective.

In some embodiments, the leakage detection device 118 may be located outside the jacket 108, thereby easing the access by a user and adding to the convenience of the user for replacing the absorbent 208. Further, the leakage detection device 118 may be connected to the channel 110 by a pipe (not shown) to receive the leaked water. In some embodiments, the leakage detection device 114 may include a wicking mechanism to absorb water from the channel 110 into the piston 204. Such mechanisms may allow the leakage detection device 114 to detect leakage on a real time basis. In some embodiments, the shut-off actuator 122 may be concealed in a housing (not shown) and a door (not shown) may be provided to access the shut-off actuator 122.

Figure 7:
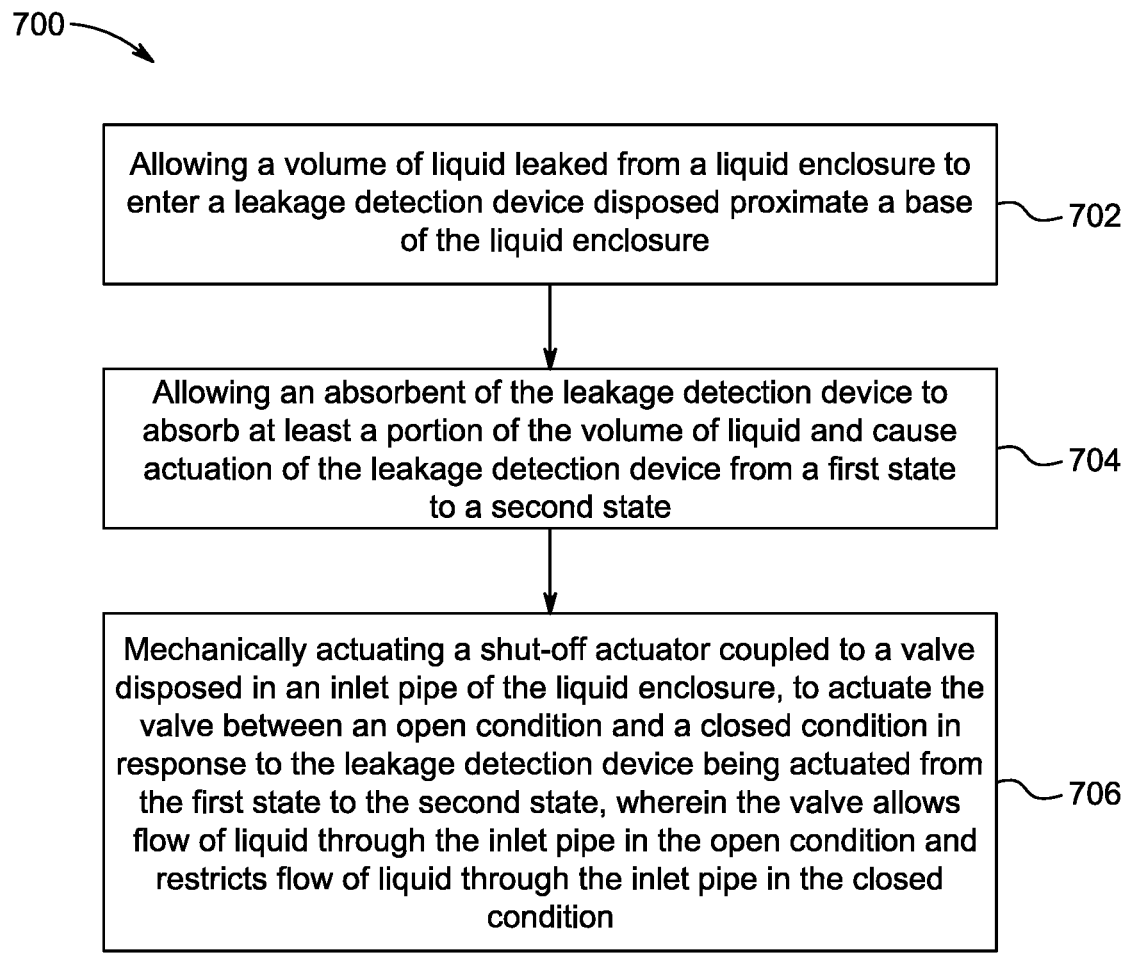
FIG. 7 is a flowchart of a method of mitigating leakage in a liquid enclosure, according to aspects of the present disclosure.

FIG. 7 illustrates a flowchart of a method 700 of mitigating leakage in the liquid enclosure, alternatively referred to as 'the tank 102'. The method 700 is described in conjunction with FIG. 1A to FIG. 6C. In an implementation, the method 700, at step 702, includes allowing a volume of liquid leaked from the liquid enclosure 102 to enter the leakage detection device 118 disposed proximate the base 114 of the liquid enclosure 102.

At step 704, the method 700 includes allowing the absorbent 208 of the leakage detection device 118 to absorb at least a portion of the volume of liquid and cause actuation of the leakage detection device 118 from the first state 'S1' to the second state 'S2'.

At step 706, the method 700 includes mechanically actuating the shut-off actuator 122 coupled to the valve 120 disposed in the inlet pipe 104 of the liquid enclosure 102. The valve 120 allows flow of liquid through the inlet pipe 104 in the open condition thereof and restricts flow of liquid through the inlet pipe 104 in the closed condition thereof. In an implementation, the method 700 includes applying the pull-force ($F_{Cable}$) on the shut-off actuator 122 through the cable 124 upon actuation of the leakage detection device 118 from the first state 'S1' to the second state 'S2'. Based on pull-force ($F_{Cable}$) applied on the shut-off actuator 122, the method 700 includes actuating the valve 120 from the open condition to the closed condition.

Although the present disclosure describes the aspects of the leakage mitigation system 116 with respect to the water heater 100, in some embodiments, the leakage mitigation system 116 may be implemented in any appliance for automatic leakage detection. Examples of such appliances include, but are not limited to, washing machine, dishwashers, and reverse osmosis systems. Additionally, use of the leakage mitigation system 116 is not limited to home environments, and can be implemented in commercial environments, such as, for example, restaurants and hospitals where liquid based appliances are used. Further, since the leakage mitigation system 116 includes mechanical components configured to trigger a preventive action based on detection of water leakage, the leakage mitigation system 116 overcomes the requirement of electric power, sensors, and control board, thereby rendering the water heater 100 simple and cost-effective. Therefore, the leakage mitigation system 116 can be implemented with the appliances at locations where supply of electric power remains a challenge.

All terminologies used herein is for mere purpose of describing embodiments and examples and should not be construed as limiting the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A leakage mitigation system comprising:
    a leakage detection device disposed proximate a base of a liquid enclosure, the leakage detection device comprising:
        a housing having an open end;
        a piston movably received within the housing and defining a hollow chamber; and
        an absorbent disposed within the hollow chamber, wherein the absorbent is configured to translate the piston from a first position to a second position based on a volume of liquid leaked from the liquid enclosure and absorbed by the absorbent;
    a valve coupled to an inlet pipe of the liquid enclosure, the valve configured to allow flow of liquid through the inlet pipe in an open condition thereof, and to restrict flow of liquid through the inlet pipe in a closed condition thereof; and
    a shut-off actuator mechanically coupled to the valve and configured to actuate the valve from the open condition to the closed condition in direct response to the piston being translated from the first position to the second position.

2. The leakage mitigation system of claim 1, further comprising a cable extending between the leakage detection device and the shut-off actuator, the cable configured to actuate the shut-off actuator based on the volume of liquid absorbed by the absorbent.

3. The leakage mitigation system of claim 1, wherein the leakage detection device further comprises a lid attached to the open end of the housing and configured to allow flow of leaked liquid to the absorbent.

4. The leakage mitigation system of claim 3, wherein the lid defines one or more openings covered with mesh configured to allow flow of the leaked liquid therethrough.

5. The leakage mitigation system of claim 3, wherein the lid is detachably coupled to the open end of the housing using a snap fit.

6. The leakage mitigation system of claim 3, wherein the piston comprises an arm extending along a longitudinal axis thereof and passing through an aperture defined in the lid and mechanically coupled with a cable.

7. The leakage mitigation system of claim 1, wherein the absorbent is a Super Absorbent Polymer (SAP) selected from a list comprising sodium polyacrylate and Potassium Polyacrylate.

8. The leakage mitigation system of claim 1, wherein the shut-off actuator comprises:
    a platform coupled to a stem of the valve;
    an actuator plate disposed on the platform and configured to rigidly and rotatably engage with the stem of the valve; and
    a pawl comprising a first end pivotally coupled to the platform, a second end mechanically attached to a cable, and a tooth located between the first end and the second end thereof, the tooth configured to retain the actuator plate in a stationary condition corresponding to the open condition of the valve,
    wherein, based on the volume of liquid absorbed by the absorbent, the cable is configured to apply a pull-force at the second end of the pawl causing the pawl to move about the first end thereof, and wherein the movement of the pawl allows the tooth to disengage from the actuator plate, allows the actuator plate to rotate, and allows actuation of the valve from the open condition to the closed condition.

9. The leakage mitigation system of claim 8, wherein the actuator plate comprises an extended portion configured to slidably engage with the tooth of the pawl.

10. The leakage mitigation system of claim 8, wherein the shut-off actuator further comprises:

a stem extension having a first end and a second end distal to the first end, the first end being detachably attached to the stem of the valve, wherein the first end of the stem extension is configured to rigidly engage with the stem of the valve via the actuator plate; and a biasing member disposed around the stem extension and configured to exert a biasing force on the actuator plate in the stationary condition corresponding to the open condition of the valve, wherein, under an influence of the biasing force, the stem extension is configured to rotate along with the actuator plate upon disengagement of the tooth of the pawl and the actuator plate.

11. The leakage mitigation system of claim 10, wherein the shut-off actuator further comprises a handle coupled to the second end of the stem extension, the handle configured to reset the valve to the open condition.

12. The leakage mitigation system of claim 8, wherein the platform comprises one or more stoppers configured to restrict rotational movement of the actuator plate.

13. A method of mitigating leakage in a liquid enclosure, the method comprising:

allowing a volume of liquid leaked from the liquid enclosure to enter a leakage detection device disposed proximate a base of the liquid enclosure;

allowing an absorbent of the leakage detection device to absorb at least a portion of the volume of liquid and cause translation of a piston of the leakage detection device from a first position to a second position; and mechanically actuating a shut-off actuator coupled to a valve disposed in an inlet pipe of the liquid enclosure, to actuate the valve between an open condition and a closed condition in direct response to the piston being translated from the first position to the second position, wherein the valve allows flow of liquid through the inlet pipe in the open condition and restricts flow of liquid through the inlet pipe in the closed condition;

wherein the absorbent is disposed within a hollow chamber of the piston.

14. The method of claim 13 further comprising:

applying a pull-force on the shut-off actuator through a cable upon actuation translation of the piston from the first position to the second position; and actuating the valve from the open condition to the closed condition based on the pull-force applied on the shut-off actuator.

15. A water heater comprising:

a tank;

an inlet pipe configured to allow ingress of water into the tank;

a jacket disposed around the tank;

a channel disposed in an annular space between the tank and the jacket, and proximate a base of the water heater, the channel configured to collect water leaked from the tank; and a leakage mitigation system configured to shut off flow of water to the tank based on a volume of water leaked from the tank, the leakage mitigation system comprising:

a leakage detection device disposed along the channel and configured to receive the water leaked from the tank, the leakage detection device comprising:

a piston defining a hollow chamber therein; and an absorbent disposed within the hollow chamber and configured to translate the piston from a first position to a second position based on a volume of water absorbed by the absorbent;

a valve coupled to the inlet pipe of the water heater, and configured to allow flow of water through the inlet pipe in an open condition, and to restrict flow of water through the inlet pipe in a closed condition;

a shut-off actuator mechanically coupled to the valve, and configured to actuate the valve from the open condition to the closed condition in direct response to the piston being translated from the first position to the second position; and a cable extending between the leakage detection device and the shut-off actuator, the cable configured to actuate the shut-off actuator based on the volume of water absorbed by the absorbent.

16. The water heater of claim 15, wherein the leakage detection device comprises:

a housing having an open end, the piston movably received therein; and a lid attached to the open end of the housing and configured to allow flow of water to the absorbent, wherein expansion of the absorbent causes the piston to translate from the first position to the second position.

17. The water heater of claim 15, wherein the shut-off actuator comprises:

a platform coupled to a stem of the valve;

an actuator plate disposed on the platform and configured to rigidly and rotatably engage with the stem of the valve;

a biasing member disposed on the platform and configured to exert a biasing force on the actuator plate in a stationary condition corresponding to the open condition of the valve; and a pawl comprising a first end pivotally coupled to the platform, a second end mechanically attached to the cable, and a tooth located between the first end and the second end thereof, the tooth configured to retain the actuator plate in the stationary condition corresponding to the open condition of the valve, wherein, based on the volume of water absorbed by the absorbent, the cable is configured to apply a pull-force at the second end of the pawl causing the pawl to move about the first end thereof, and wherein the movement of the pawl allows the tooth to disengage from the actuator plate, allows the actuator plate to rotate, and allows actuation of the valve from the open condition to the closed condition.

18. The water heater of claim 15 further comprising:

an opening defined in the jacket proximate the base of the water heater to allow access to the leakage detection device from outside; and a door coupled to the jacket to close the opening.

19. The water heater of claim 15, wherein the cable is routed between the tank and the jacket.

* * * * *